United States Patent
Oh et al.

(10) Patent No.: US 10,553,903 B2
(45) Date of Patent: Feb. 4, 2020

(54) ELECTROLYTE FOR LITHIUM SECONDARY BATTERY AND LITHIUM SECONDARY BATTERY INCLUDING THE SAME

(71) Applicant: LG Chem, Ltd., Seoul (KR)

(72) Inventors: Jeong Woo Oh, Daejeon (KR); Kyoung Ho Ahn, Daejeon (KR); Chul Haeng Lee, Daejeon (KR); Jung Hoon Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/078,151

(22) PCT Filed: Dec. 8, 2017

(86) PCT No.: PCT/KR2017/014432
§ 371 (c)(1),
(2) Date: Aug. 21, 2018

(87) PCT Pub. No.: WO2018/106078
PCT Pub. Date: Jun. 14, 2018

(65) Prior Publication Data
US 2019/0058216 A1    Feb. 21, 2019

(30) Foreign Application Priority Data

Dec. 8, 2016  (KR) .................. 10-2016-0166991
Dec. 8, 2016  (KR) .................. 10-2016-0166992
Dec. 8, 2017  (KR) .................. 10-2017-0168433

(51) Int. Cl.
*H01M 10/0565*  (2010.01)
*H01M 10/052*  (2010.01)
(Continued)

(52) U.S. Cl.
CPC ..... *H01M 10/0565* (2013.01); *H01M 10/052* (2013.01); *H01M 10/0567* (2013.01);
(Continued)

(58) Field of Classification Search
CPC .......... H01M 10/0565; H01M 10/052; H01M 10/0567; H01M 10/0568
See application file for complete search history.

(56) References Cited

U.S. PATENT DOCUMENTS 6,190,805 B1   2/2001  Takeuchi et al.
10,476,104 B2  11/2019  Ahn et al.
(Continued)

FOREIGN PATENT DOCUMENTS

CN   105778042 A   7/2016
EP   3203564 A1    8/2017
(Continued)

OTHER PUBLICATIONS

Kim JY, Kim CH, Yoo DJ, Suh KD. Hydrophobic and hydrophilic aggregation of tailor-made urethane acrylate anionomers in various solvents and their network structures. Journal of Polymer Science Part B: Polymer Physics. Jul. 15, 2000;38(14):1903-16.
(Continued)

*Primary Examiner* — Helen Oi K Conley
(74) *Attorney, Agent, or Firm* — Lerner, David, Littenberg, Krumholz & Mentlik, LLP

(57) ABSTRACT

The present invention relates to an electrolyte for a lithium secondary battery and a lithium secondary battery including the same, and particularly, to an electrolyte for a lithium secondary battery, which includes a lithium salt, an organic solvent, and an oligomer represented by Formula 1 described in the present specification, and a lithium second-
(Continued)

ary battery in which overall performance is improved by suppressing reactivity with lithium metal by including the electrolyte.

15 Claims, 7 Drawing Sheets

(51) Int. Cl.
*H01M 10/0567* (2010.01)
*H01M 10/0568* (2010.01)

(52) U.S. Cl.
CPC .................. *H01M 10/0568* (2013.01); *H01M 2300/0025* (2013.01); *H01M 2300/0085* (2013.01)

(56) References Cited

U.S. PATENT DOCUMENTS

| | | |
|---|---|---|
| 2011/0183216 A1 | 7/2011 | Kim et al. |
| 2013/0136998 A1 | 5/2013 | Hwang et al. |
| 2017/0229735 A1 | 8/2017 | Ahn et al. |

FOREIGN PATENT DOCUMENTS

| | | |
|---|---|---|
| JP | H08295715 A | 11/1996 |
| JP | H10007759 A | 1/1998 |
| JP | 2006310071 A | 11/2006 |
| KR | 20090015859 A | 2/2009 |
| KR | 20130058403 A | 6/2013 |
| KR | 20160040127 A | 4/2016 |
| RU | 2234168 C1 | 8/2004 |

OTHER PUBLICATIONS

Santhosh P, Gopalan A, Vasudevan T, Lee KP. Evaluation of a cross-linked polyurethane acrylate as polymer electrolyte for lithium batteries. Materials research bulletin. Jun. 15, 2006;41(6):1023-37.

Yarmolenko OV, Efimov ON. Effect of Dibenzo-18-crown-6 on the Polymer Electrolyte/Lithium Anode Interface. Russian Journal of Electrochemistry. May 1, 2005;41(5):568-71.

International Search report for PCT/KR2017/014432 dated Mar. 20, 2018.

Extended European Search Report including Written Opinion for Application No. EP17878254.6 dated Nov. 22, 2019.

ELECTROLYTE FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/014432 filed Dec. 8, 2017, which claims priority from Korean Patent Application No. 10-2016-0166991 filed Dec. 8, 2016, Korean Patent Application No. 10-2016-0166992 filed Dec. 8, 2016, and Korean Patent Application No. 10-2017-0168433 filed Dec. 8, 2017, the disclosures of which are incorporated herein by reference.

TECHNICAL FIELD

The present invention relates to an electrolyte for a lithium secondary battery having improved high-temperature durability, and a lithium secondary battery including the same.

BACKGROUND ART

There is a growing interest in energy storage technologies as technology development and demand with respect to mobile phones, camcorders, notebook PCs, and even electric vehicles have recently increased.

In particular, among the energy storage technologies, there emerges an interest in lithium secondary batteries having high energy density and high voltage and capable of being charged and discharged.

The lithium secondary battery is generally composed of a positive electrode and a negative electrode, which include electrode active materials capable of intercalating/deintercalating lithium ions, and an electrolyte as a lithium ion transfer medium.

As the electrolyte, a liquid electrolyte including a non-aqueous organic solvent, in which an electrolyte salt is dissolved, or a gel polymer electrolyte further including a matrix polymer with the liquid electrolyte is being used.

Gas may be generated in the secondary battery due to the decomposition of the electrolyte during charge and discharge of the lithium secondary battery or a side reaction between the electrode and the electrolyte, and the gas generation is further increased during high-temperature storage.

The continuously generated gas may not only cause an increase in internal pressure of the battery to cause deformation of the battery, for example, thickness expansion of the battery, but may also locally change adhesion on an electrode surface in the battery to prevent an electrode reaction from occurring equally on the entire electrode surface.

Thus, in order to improve stability and high output characteristics of the battery, there is a need to develop a lithium secondary battery in which stability is improved by suppressing gas generation and exothermic reaction during high-temperature storage and overcharge.

PRIOR ART DOCUMENT

Korean Patent Application Laid-open Publication No. 2013-0058403

Korean Patent Application Laid-open Publication No. 2009-0015859

DISCLOSURE OF THE INVENTION

Technical Problem

An aspect of the present invention provides an electrolyte for a lithium secondary battery in which high-temperature durability is improved by suppressing an oxidation reaction during high-temperature storage and overcharge.

Another aspect of the present invention provides a lithium secondary battery in which stability during high-temperature storage and overcharge is improved by including the electrolyte for a lithium secondary battery.

Technical Solution

According to an aspect of the present invention, there is provided an electrolyte for a lithium secondary battery including:
a lithium salt;
an organic solvent; and
an oligomer represented by Formula 1 below.

[Formula 1]

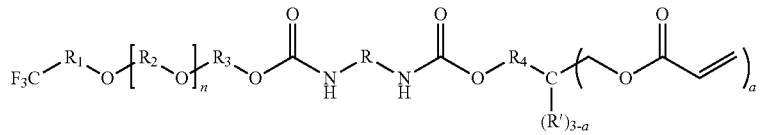

In Formula 1,

R is an aliphatic hydrocarbon group or an aromatic hydrocarbon group, $R_1$ to $R_3$ are each independently a fluorine-substituted or unsubstituted alkylene group having 1 to 5 carbon atoms, $R_4$ is an alkylene group having 1 to 4 carbon atoms, R' is hydrogen or an alkyl group having 1 to 3 carbon atoms, a is 1 to 3, n is the number of repeating units, and n is an integer of 1 to 75.

In this case, in the oligomer represented by Formula 1, the aliphatic hydrocarbon group may include at least one alicyclic hydrocarbon group selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms, or a linear hydrocarbon group selected from the group consisting of a substituted or unsubstituted alkylene group having 1 to 20 carbon atoms;

a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms, and the aromatic hydrocarbon group may include a substituted or unsubstituted arylene group having 6 to 20 carbon atoms; or a substituted or unsubstituted heteroarylene group having 2 to 20 carbon atoms.

Specifically, the oligomer represented by Formula 1 may include an oligomer represented by Formula 1a below.

oligomer represented by Formula 1, the electrolyte for a lithium secondary battery may be a gel polymer electrolyte.

The polymer derived from the oligomer represented by Formula 1 may be a matrix polymer in which the oligomer represented by Formula 1 is polymerized in the presence of a polymerization initiator to have a three-dimensional structure.

The gel polymer electrolyte may further include inorganic particles.

The inorganic particles may include a single material selected from the group consisting of $BaTiO_3$, $BaTiO_3$, $Pb(Zr_xTi_{1-x})O_3$ ($0 \leq x \leq 1$) (PZT), $Pb_{1-b}La_bZr_{1-c}Ti_cO_3$ (PLZT, where $0<b<1$, $0<c<1$), $Pb(Mg_{1/3}Nb_{2/3})O_3$—$PbTiO_3$ (PMN-

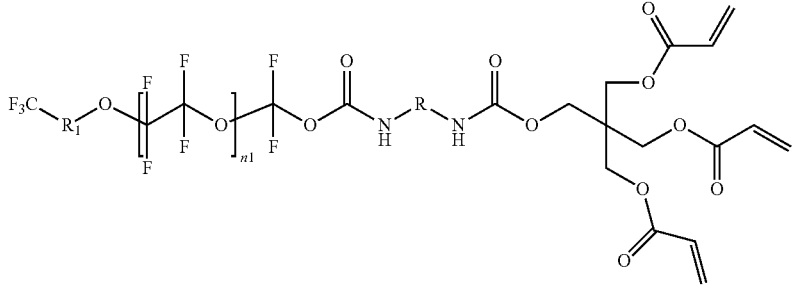

[Formula 1a]

In Formula 1a,

R is an aliphatic hydrocarbon group or an aromatic hydrocarbon group, $R_1$ is a fluorine-substituted or unsubstituted alkylene group having 1 to 5 carbon atoms, n1 is the number of repeating units, and n1 is an integer of 1 to 75.

Specifically, the oligomer represented by Formula 1a may include an oligomer represented by Formula 1a-1 below.

PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, or a mixture of two or more thereof.

The inorganic particles may be included in an amount of 10 wt % to 25 wt % based on the total weight of the electrolyte for a lithium secondary battery.

According to another aspect of the present invention,

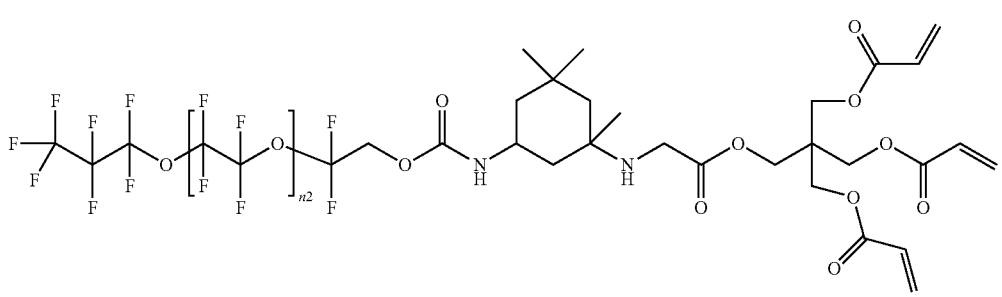

[Formula 1a-1]

In Formula 1a-1, n2 is the number of repeating units, and n2 is an integer of 20 to 75.

The oligomer represented by Formula 1 may be included in an amount of 0.5 wt % to 20 wt %, for example, 0.5 wt % to 15 wt % based on a total weight of the electrolyte for a lithium secondary battery.

In a case in which the electrolyte for a lithium secondary battery includes the oligomer represented by Formula 1, the electrolyte for a lithium secondary battery may be a liquid electrolyte.

Also, in a case in which the electrolyte for a lithium secondary battery includes a polymer derived from the there is provided a lithium secondary battery including a negative electrode, a positive electrode, a separator disposed between the negative electrode and the positive electrode, and the electrolyte for a lithium secondary battery of the present invention.

In this case, the electrolyte for a lithium secondary battery may be a liquid electrolyte or a gel polymer electrolyte.

Advantageous Effects

As described above, the present invention may provide an electrolyte for a lithium secondary battery in which wettability may not only be improved by lowering surface tension with a surface of an electrode by including an oligomer having hydrophilic and hydrophobic functional groups, but high-temperature durability may also be improved by preventing electrolyte side reaction and oxidation reaction during high-temperature storage and overcharge by forming a stable ion conductive film on the surface of the electrode during initial charge. Furthermore, in the present invention, since an exothermic reaction during the high-temperature storage and overcharge is suppressed by including the electrolyte for a lithium secondary battery, a lithium secondary battery having improved overall performance, such as stability, may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
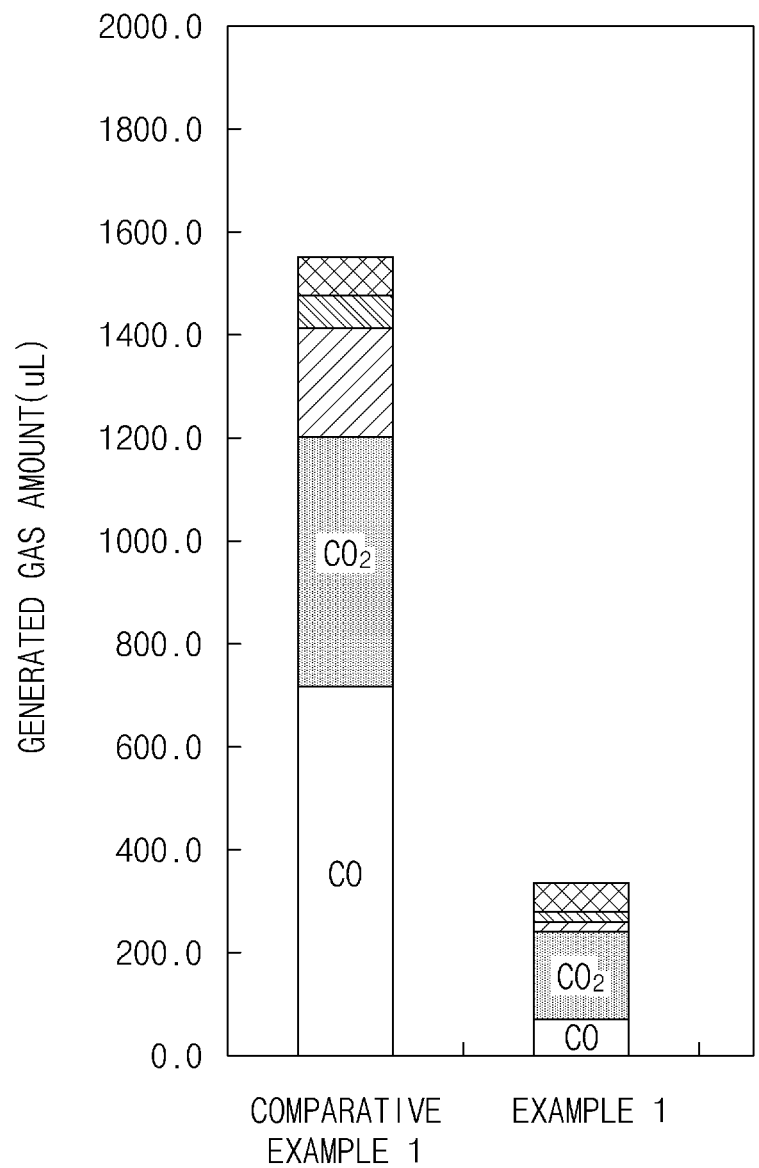
FIG. 1 is a graph illustrating amounts of gas generated from lithium secondary batteries of Example 1 and Comparative Example 1 according to Experimental Example 2 of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Specifically, in an embodiment of the present invention, provided is an electrolyte for a lithium secondary battery which includes:

a lithium salt;

an organic solvent; and an oligomer represented by Formula 1 below.

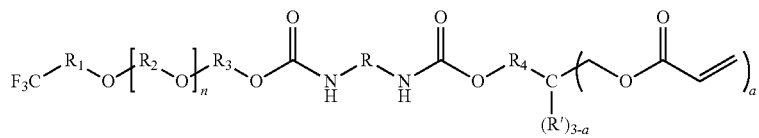

[Formula 1]

In Formula 1,

R is an aliphatic hydrocarbon group or an aromatic hydrocarbon group, $R_1$ to $R_3$ are each independently a fluorine-substituted or unsubstituted alkylene group having 1 to 5 carbon atoms, $R_4$ is an alkylene group having 1 to 4 carbon atoms, R' is hydrogen or an alkyl group having 1 to 3 carbon atoms, a is 1 to 3, n is the number of repeating units, and n is an integer of 1 to 75.

First, in the electrolyte for a lithium secondary battery according to the embodiment of the present invention, any lithium salt typically used in an electrolyte for a lithium secondary battery may be used as the above lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof, and, in addition thereto, a lithium salt, such as a lithium imide salt represented by lithium bisperfluoroethanesulfonimide (LiBETI, $LiN(SO_2C_2F_5)_2$), lithium fluorosulfonyl imide (LiFSI, $LiN(SO_2F)_2$), and lithium (bis)trifluoromethanesulfonimide (LiTFSI, $LiN(SO_2CF_3)_2$) which are typically used in the electrolyte of the lithium secondary battery, may be used without limitation. Specifically, the lithium salt may include a single material selected from the group consisting of $LiPF_6$, $LiBF_4$, $LiCH_3CO_2$, $LiCF_3CO_2$, $LiCH_3SO_3$, LiFSI, LiTFSI, and $LiN(C_2F_5SO_2)_2$, or a mixture of two or more thereof.

The lithium salt may be appropriately changed in a normally usable range, but may specifically be included in a concentration of 0.8 M to 3 M, for example, 1.0 M to 2.5 M in the electrolyte for a lithium secondary battery. In a case in which the concentration of the lithium salt is greater than 3 M, since viscosity of the electrolyte is increased, a lithium ion-transfer effect may be reduced.

Also, in the electrolyte for a lithium secondary battery according to the embodiment of the present invention, the organic solvent is not limited as long as it may minimize decomposition due to an oxidation reaction during charge and discharge of the secondary battery and may exhibit desired characteristics with an additive. For example, as the organic solvent, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, δ-valerolactone, and ε-caprolactone, or a mixture of two or more thereof, but the present invention is not limited thereto.

Among the ester-based solvents, since the cyclic carbonate-based compound is well dissociate the lithium salt in the electrolyte due to high permittivity as a highly viscous organic solvent, the cyclic carbonate-based compound may be preferably used. Since an electrolyte having high electrical conductivity may be prepared when the above cyclic carbonate-based compound is mixed with the low viscosity, low permittivity linear carbonate-based compound, such as dimethyl carbonate and diethyl carbonate, and the linear ester-based compound in an appropriate ratio, the cyclic carbonate-based compound may be more preferably used.

Also, the electrolyte for a lithium secondary battery according to the embodiment of the present invention may include an oligomer represented by Formula 1.

Since the oligomer represented by Formula 1 is electrochemically stable by having a balanced affinity to a positive electrode or separator (SRS layer) and a negative electrode or separator fabric in the secondary battery, it greatly helps to improve performance of the lithium secondary battery.

That is, since the oligomer represented by Formula 1 contains a fluorine-substituted ethylene group as a hydrophobic portion as well as an acrylate-based functional group as a hydrophilic portion capable of forming a crosslink at both ends by itself, it acts as a surfactant in the battery to maintain a balanced affinity to each of the positive electrode, the negative electrode, and the separator (SRS layer), and thus, it may reduce interfacial resistance. Therefore, the electrolyte for a lithium secondary battery including the oligomer represented by Formula 1 may have a more improved wetting effect.

In addition, since the oligomer represented by Formula 1 has ability to dissociate the lithium salt, it may improve lithium ion mobility. In particular, since the oligomer represented by Formula 1 contains a fluorine-substituted ethylene group having high electrochemical stability and low reactivity with lithium (Li) ions as a repeating unit of a main chain as well as a fluorine-substituted alkyl group at the end, it may control a side reaction between the electrolyte and the lithium ions (Li+), an electrolyte oxidation reaction, and a decomposition reaction of the lithium salt during high-temperature storage and overcharge by forming a stable ion conductive film on a surface of an electrode during initial charge.

Thus, since the generation of gas, such as CO or $CO_2$, may be reduced during overcharge, high-temperature durability may be improved.

Therefore, with respect to the electrolyte for a lithium secondary battery of the present invention including the oligomer represented by Formula 1 instead of a polymer having an alkylene oxide skeleton, such as ethylene oxide, propylene oxide, or butylenes oxide, a block copolymer having dialkyl siloxane, fluorosiloxane, or units thereof, and a graft polymer which have been commercially available during the preparation of a conventional gel polymer electrolyte, since the electrolyte side reaction and the oxidation reaction are reduced, stability of an interface between the electrode and the electrolyte may be achieved to improve the high-temperature durability.

In this case, in the oligomer represented by Formula 1, the aliphatic hydrocarbon group may include at least one alicyclic hydrocarbon group selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms, or a linear hydrocarbon group selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms, and the aromatic hydrocarbon group may include a substituted or unsubstituted arylene group having 6 to 20 carbon atoms; or a substituted or unsubstituted heteroarylene group having 2 to 20 carbon atoms.

Specifically, the oligomer represented by Formula 1 may include an oligomer represented by Formula 1a below.

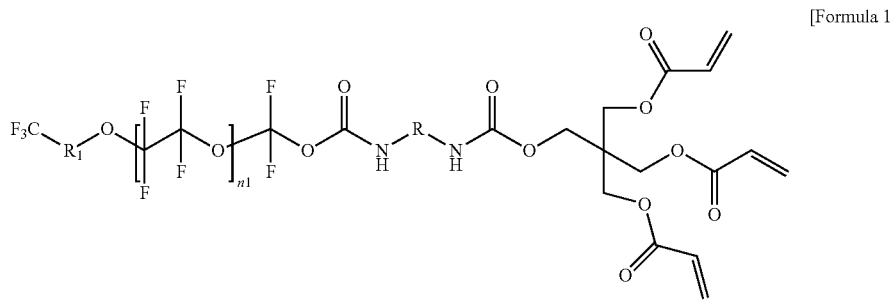

[Formula 1a]

In Formula 1a,

R is an aliphatic hydrocarbon group or an aromatic hydrocarbon group, $R_1$ is a fluorine-substituted or unsubstituted alkylene group having 1 to 5 carbon atoms, n1 is the number of repeating units, and n1 is an integer of 1 to 75.

Specifically, the oligomer represented by Formula 1a may include an oligomer represented by Formula 1a-1 below.

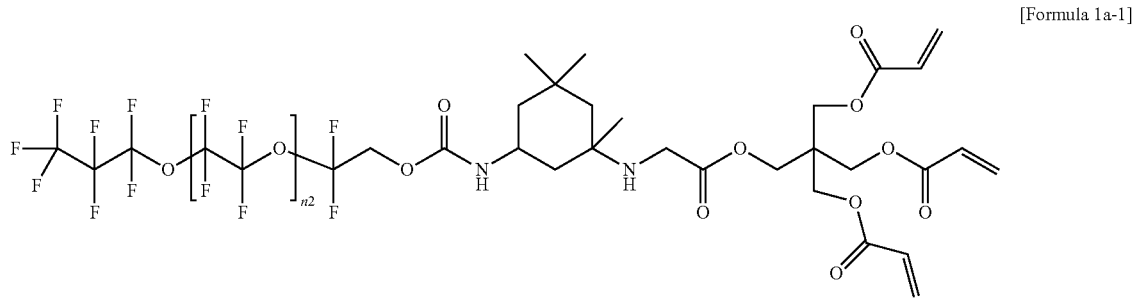

[Formula 1a-1]

In Formula 1a-1, n2 is the number of repeating units, and n2 is an integer of 20 to 75.

The oligomer represented by Formula 1 may be included in an amount of 0.5 wt % to 20 wt %, particularly 0.5 wt % to 15 wt %, and more particularly 0.5 wt % to 10 wt % based on a total weight of the electrolyte for a lithium secondary battery.

In a case in which the amount of the oligomer represented by Formula 1 is 0.5 wt % or more, a gel polymer electrolyte having a stable network structure may be prepared, and, in a case in which the amount of the oligomer represented by Formula 1 is 20 wt % or less, since an increase in resistance due to the addition of an excessive amount of the oligomer is prevented, wettability may be secured and simultaneously, it is possible to prevent disadvantages, such as a decrease in ion conductivity, by improving restrictions on the movement of lithium ions.

Also, a weight-average molecular weight (Mw) of the oligomer represented by Formula 1 may be controlled by the number of repeating units, and may be in a range of about 1,000 g/mol to about 100,000 g/mol, particularly 1,000 g/mol to 50,000 g/mol, and more particularly 2,000 g/mol to 7,000 g/mol. In a case in which the weight-average molecular weight of the oligomer is within the above range, a polymer matrix may be effectively formed by the appropriate molecular weight of the oligomer. In addition, since it is easy to substitute various functional groups as needed, various performance improvement effects may be obtained.

In a case in which the weight-average molecular weight of the oligomer is less than 1,000 g/mol, since the formation of the stable polymer network is difficult, its own electrochemical stability and role of surfactant may not be expected, and, in a case in which the weight-average molecular weight of the oligomer is greater than 100,000 g/mol, since physical properties of the oligomer itself become rigid and an affinity to an electrolyte solvent is reduced by an increase in viscosity, solubility may be reduced.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

In a case in which the electrolyte for a lithium secondary battery according to the embodiment of the present invention includes the oligomer represented by Formula 1, the electrolyte for a lithium secondary battery of the present invention may be a liquid electrolyte.

Also, in a case in which the electrolyte for a lithium secondary battery according to the embodiment of the present invention includes a polymer derived from the oligomer represented by Formula 1, the electrolyte for a lithium secondary battery of the present invention may be a gel polymer electrolyte.

In this case, the polymer derived from the oligomer represented by Formula 1 may be a matrix polymer in which the oligomer represented by Formula 1 is polymerized in the presence of a polymerization initiator to have a three-dimensional structure.

In a case in which the electrolyte for a lithium secondary battery of the present invention is a gel polymer electrolyte, a conventional polymerization initiator capable of generating a radical by heat and light, which is used during the preparation of a conventional gel polymer electrolyte, may be used without limitation as the polymerization initiator used for the formation of a gel. Specifically, as the polymerization initiator, an azo-based polymerization initiator or a peroxide-based polymerization initiator may be used, and, as a representative example, the polymerization initiator may include at least one peroxide-based compound selected from the group consisting of benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo-based compound selected from the group consisting of 2,2'-azobis(2-cyanobutane), dimethyl 2,2-azobis(2-methylpropionate), 2,2'-azobis(methylbutyronitrile), 2,2'-azobis(iso-butyronitrile) (AIBN), and 2,2'-azobisdimethyl-valeronitrile (AMVN).

The polymerization initiator may form a radical by being dissociated by heat in the battery, for a non-limiting example, at a temperature of 30° C. to 100° C., for example, 60° C. to 80° C., or by being dissociated at room temperature (5° C. to 30° C.).

Also, the polymerization initiator may be included in an amount of about 0.01 part by weight to about 20 parts by weight, for example, 5 parts by weight based on total 100 parts by weight of the oligomer, and, in a case in which the polymerization initiator is included within the above range, since a gelation reaction may be facilitated, the occurrence of gelation during the injection of a composition into the battery or the cause of a side reaction by the remaining unreacted polymerization initiator after the polymerization may be prevented. In particular, with respect to some polymerization initiators, nitrogen or oxygen gas may be generated during the occurrence of a radical by heat or the like. The gas generation is most likely lead to a gas trap or gas bubbling phenomenon during the formation of the gel polymer electrolyte. Since the gas generation causes defects in the gel polymer electrolyte, this results in quality degradation of the electrolyte. Thus, in the case that the polymerization initiator is included within the above range, disadvantages, for example, the generation of a large amount of gas, may be more effectively prevented.

Also, in the gel polymer electrolyte of the present invention, the gel polymer electrolyte may have a gel content of about 1 wt % or more, for example, about 20 wt % or more at a temperature of 25° C.

Furthermore, the gel polymer electrolyte of the present invention may further include inorganic particles.

The inorganic particles are impregnated in the polymer network and thus, may allow a high-viscosity solvent to be well permeated through pores which are formed by spaces between the inorganic particles. That is, since the inorganic particles are included, an effect of further improving wettability to the high-viscosity solvent due to affinity between polar materials and a capillary phenomenon may be obtained.

Inorganic particles, in which permittivity is high and an oxidation and/or reduction reaction does not occur in an operating voltage range (for example, 0 to 5 V based on Li/Li$^+$) of the lithium secondary battery, may be used as the above inorganic particles.

Specifically, typical examples of the inorganic particles may be a single material, having a dielectric constant of 5 or more, selected from the group consisting of $BaTiO_3$, $BaTiO_3$, $Pb(Zr_xTi_{1-x})O_3$ ($0 \leq x \leq 1$) (PZT), $Pb_{1-b}La_bZr_{1-c}Ti_cO_3$ (PLZT, where $0<b<1$, $0<c<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, and a mixture thereof, or a mixture of two or more thereof.

Also, in addition to the above inorganic particles, inorganic particles having lithium ion transfer ability, that is, lithium phosphate ($Li_3PO_4$), lithium titanium phosphate ($Li_dTi_e(PO_4)_3$, $0<d<2$, $0<e<3$), lithium aluminum titanium phosphate ($Li_{a1}Al_{b1}Ti_{c1}(PO_4)_3$, $0<a1<2$, $0<b1<1$, $0<c1<3$), $(LiAlTiP)_{a2}O_{b2}$-based glass ($0<a2<4$, $0<b2<13$) such as $14Li_2O-9Al_2O_3-38TiO_2-39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_{d1}$, $0<a4<4$, $0<b4<1$, $0<c2<1$, $0<d1<5$) such as $Li_{3.25}Ge_{0.25}P_{0.75}S_4$, lithium nitride ($Li_{a5}N_{b5}$, $0<a5<4$, $0<b5<2$) such as $Li_3N$, $SiS_2$-based glass ($Li_{a6}Si_{b6}Sc_3$, $0<a6<3$, $0<b6<2$, $0<c3<4$) such as $Li_3PO_4$—$Li_2S$—$SiS_2$, $P_2S_5$-based glass ($Li_{a7}Pb_7Sc_4$, $0<a7<3$, $0<b7<3$, $0<c4<7$), such as $LiI$—$Li_2S$—$P_2S_5$, or a mixture thereof may be further included.

The inorganic particles may be included in an amount of 10 wt % to 25 wt % based on the total weight of the electrolyte for a lithium secondary battery.

In a case in which the amount of the inorganic particles is less than 10 wt %, it is difficult to expect a wetting improvement effect in the high-viscosity solvent, and, in a case in which the amount of the inorganic particles is greater than 25 wt %, resistance performance of the battery may be degraded.

An average particle diameter of the inorganic particles may be in a range of about 0.001 μm to about 10 μm so as to provide adequate porosity with uniform thickness in the gel polymer electrolyte. In a case in which the average particle diameter is less than 0.001 μm, dispersibility may be reduced. In a case in which the average particle diameter is greater than 10 μm, the thickness of a porous coating layer may not only be increased, but a phenomenon may also occur in which the inorganic particles are agglomerated. Thus, mechanical strength may be reduced while the inorganic particles are exposed to the outside of the gel polymer electrolyte.

Also, the gel polymer electrolyte may have an amount of the unreacted oligomer of 20% or less based on a total input of the reactive oligomer at a temperature of 25° C.

In this case, after the gel polymer electrolyte is obtained, the gel polymer electrolyte is solvent (acetone)-extracted, and subsequently, the amount of the unreacted oligomer may be confirmed by the nuclear magnetic resonance (NMR) measurement of the extracted solvent.

Furthermore, the electrolyte for a lithium secondary battery according to the embodiment of the present invention may further include an additive for forming a solid electrolyte interface (SEI), if necessary. As typical examples of the additive for forming an SEI film which may be used in the present invention, vinylene carbonate, vinyl ethylene carbonate, fluoroethylene carbonate, cyclic sulfite, saturated sultone, unsaturated sultone, and a non-cyclic sulfone may be used alone or in a mixture of two or more thereof.

In this case, the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, the saturated sultone may include 1,3-propane sultone and 1,4-butane sultone, the unsaturated sultone may include ethene sultone, 1,3-propene sultone, 1,4-butene sultone, and 1-methyl-1,3-propene sultone, and the non-cyclic sulfone may include divinyl sulfone, dimethyl sulfone, diethyl sulfone, methyl ethyl sulfone, and methyl vinyl sulfone.

In this case, the additive for forming an SEI film may be included in an amount of 7 wt % or less, for example, 0.01 wt % to 5 wt % based on the total weight of the electrolyte for a lithium secondary battery to prevent a side reaction and an increase in resistance due to the excessive amount of the additive used.

Since the gel polymer electrolyte of the present invention includes the matrix polymer in which the oligomer represented by Formula 1 is polymerized to have a three-dimensional structure, mechanical properties and ion conductivity may not only be improved, but may also secure high-temperature durability by suppressing the oxidation reaction during high-temperature storage and overcharge. In addition, the gel polymer electrolyte of the present invention may form a protective layer composed of a polymer on the surfaces of the positive electrode and the negative electrode, or may suppress the generation of gas in the battery at high temperature by suppressing the side reaction through anion stabilization using a polymer structure and increasing adhesion between the electrodes. Thus, a lithium secondary battery having improved stability during the high-temperature storage and overcharge may be prepared.

Also, in an embodiment of the present invention, provided is a lithium secondary battery including a negative electrode, a positive electrode, a separator disposed between the negative electrode and the positive electrode, and the electrolyte for a lithium secondary battery of the present invention.

The electrolyte for a lithium secondary battery may be a liquid electrolyte or a gel polymer electrolyte.

In a case in which the electrolyte for a lithium secondary battery is a liquid electrolyte, the lithium secondary battery of the present invention may be prepared by accommodating an electrode assembly, which is formed by sequentially stacking the positive electrode, the negative electrode, and the separator selectively disposed between the positive electrode and the negative electrode, in a secondary battery case or an outer case and then injecting the electrolyte for a lithium secondary battery of the present invention.

Furthermore, in a case in which the electrolyte for a lithium secondary battery is a gel polymer electrolyte including a polymer matrix which is formed by polymerization of the oligomer represented by Formula 1, the lithium secondary battery of the present invention may be prepared by accommodating an electrode assembly, which is formed by sequentially stacking the positive electrode, the negative electrode, and the separator selectively disposed between the positive electrode and the negative electrode, in a secondary battery case or an outer case, injecting the electrolyte for a lithium secondary battery, and then performing a curing reaction.

For example, the gel polymer electrolyte may be formed by in-situ polymerization in the secondary battery after the injection of the electrolyte for a lithium secondary battery. The in-situ polymerization may be performed by using an electron beam (E-beam), γ-rays, and a room temperature or high temperature aging process, and, according to an embodiment of the present invention, the in-situ polymerization may be performed by heat polymerization. In this case, polymerization time required may be in a range of about 2 minutes to about 48 hours, and heat polymerization temperature may be in a range of 60° C. to 100° C., for example, 60° C. to 80° C.

In the lithium secondary battery of the present invention, any positive electrode, negative electrode, and separator, which are prepared by a conventional method and used during the preparation of a lithium secondary battery, may be used as the positive electrode, negative electrode, and separator.

First, the positive electrode may be prepared by forming a positive electrode material mixture layer on a positive electrode collector. The positive electrode material mixture layer may be prepared by coating the positive electrode collector with a positive electrode active material slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}CO_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})\,O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})\,O_2$, $Li(Ni_{0.6}Mn_{0.2}Co_{0.2})\,O_2$, $Li(Ni_{0.5}Mn_{0.3}Co_{0.2})\,O_2$, $Li(Ni_{0.7}Mn_{0.15}Co_{0.15})\,O_2$, or $Li(Ni_{0.8}Mn_{0.1}Co_{0.1})\,O_2$), or lithium nickel cobalt aluminum oxide (e.g., $LiNi_{0.8}Co_{0.15}Al_{0.05}O_2$ etc.).

The positive electrode active material may be included in an amount of 80 wt % to 99 wt %, for example, 85 wt % to 95 wt % based on a total weight of solid content in the positive electrode active material slurry.

In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode active material slurry.

Those sold under the names, such as acetylene black-based products (Chevron Chemical Company, Denka black (Denka Singapore Private Limited), or Gulf Oil Company), Ketjen black EC-based products (Armak Company), Vulcan XC-72 (Cabot Company), and Super P (Timcal Graphite & Carbon), may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

Also, the negative electrode may be prepared by forming a negative electrode material mixture layer on a negative electrode collector. The negative electrode material mixture layer may be formed by coating the negative electrode collector with a negative electrode active material slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0<x\leq1$), $Li_{x8}WO_2$ ($0\leq x8\leq1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x\leq1$; $1\leq y\leq3$; $1\leq z\leq8$) may be used as the metal composite oxide.

The material, which may be doped and undoped with lithium, may include Si, $SiO_{x7}$ ($0<x7<2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode active material slurry.

The binder is a component that assists in the binding between the conductive agent, the active material, and the current collector, wherein the binder is commonly added in an amount of 1 wt % to 30 wt % based on the total weight of the solid content in the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode active material slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Lithium Secondary Battery Including Liquid Electrolyte

Example 1

(Liquid Electrolyte Preparation)

A liquid electrolyte was prepared by adding 5 g of the compound of Formula 1a-1 (n2=55, weight-average molecular weight (Mw): 5,000) to 95 g of a non-aqueous organic solvent (ethylene carbonate (EC):ethyl methyl carbonate (EMC)=3:7 (vol %)) in which 1 M $LiPF_6$ was dissolved (see Table 1 below)

(Secondary Battery Preparation)

94 wt % of $LiNi_{1/3}Co_{1/3}Mn_{1/3}O_2$(NCM) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode active material slurry (solid concentration of 50 wt %). An about 20 μm thick aluminum (Al) thin film, as a positive electrode collector, was coated with the positive electrode active material slurry and dried, and the coated Al thin film was then roll-pressed to prepare a positive electrode.

96 wt % of carbon powder as a negative electrode active material, 3 wt % of polyvinylidene fluoride (PVDF) as a binder, and 1 wt % of carbon black, as a conductive agent, were added to NMP, as a solvent, to prepare a negative electrode active material slurry (solid concentration of 65 wt %). A 10 μm thick copper (Cu) thin film, as a negative electrode collector, was coated with the negative electrode active material slurry and dried, and the coated Cu thin film was then roll-pressed to prepare a negative electrode.

After an electrode assembly was prepared by sequentially stacking the prepared positive electrode, a separator formed of three layers of polypropylene/polyethylene/polypropylene (PP/PE/PP) and the prepared negative electrode, the electrode assembly was put in a battery case, and the liquid electrolyte was injected to prepare a lithium secondary battery.

Example 2

A liquid electrolyte and a secondary battery including the same were prepared in the same manner as in Example 1 except that 20 g of the compound of Formula 1a-1 (n2=55, weight-average molecular weight (Mw): 5,000) was included in 80 g of the non-aqueous organic solvent during the preparation of the liquid electrolyte in Example 1 (see Table 1 below).

Example 3

A liquid electrolyte and a secondary battery including the same were prepared in the same manner as in Example 1 except that 0.3 g of the compound of Formula 1a-1 (n2=55, weight-average molecular weight (Mw): 5,000) was included in 99.7 g of the non-aqueous organic solvent during the preparation of the liquid electrolyte in Example 1 (see Table 1 below).

Example 4

A liquid electrolyte and a secondary battery including the same were prepared in the same manner as in Example 1 except that 30 g of the compound of Formula 1a-1 (n2=55, weight-average molecular weight (Mw): 5,000) was included in 70 g of the non-aqueous organic solvent during the preparation of the liquid electrolyte in Example 1 (see Table 1 below).

Comparative Example 1

A liquid electrolyte and a secondary battery including the same were prepared in the same manner as in Example 1 except that except that the compound of Formula 1a-1 was not included during the preparation of the liquid electrolyte in Example 1 (see Table 1 below).

Comparative Example 2

A liquid electrolyte and a secondary battery including the same were prepared in the same manner as in Example 1 except that the compound of Formula 1a-1 was not included and a non-aqueous organic solvent (EC:PC:DEC=3:2:5 vol %), in which 1 M LiFSI was dissolved, was used during the preparation of the liquid electrolyte in Example 1 (see Table 1 below).

II. Lithium Secondary Battery Including Gel Polymer Electrolyte

Example 5

(Preparation of Composition for Gel Polymer Electrolyte)

A composition for a gel polymer electrolyte was prepared by adding 5 g of the oligomer of Formula 1a-1 (n2=55, weight-average molecular weight (Mw): 5,000), 0.5 g of 2,2'-azobis(isobutyronitrile) as a polymerization initiator, and 1 g of vinylene carbonate (VC) to 93.5 g of a non-aqueous organic solvent (ethylene carbonate (EC):ethyl methyl carbonate (EMC)=3:7 (vol %)) in which 1 M $LiPF_6$ was dissolved (see Table 1 below).

(Secondary Battery Preparation)

94 wt % of $LiNi_{1/3}Co_{1/3}Mn_{1/3}O_2$(NCM) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode active material slurry (solid concentration of 50 wt %). An about 20 μm thick aluminum (Al) thin film, as a positive electrode collector, was coated with the positive electrode active material slurry and dried, and the coated Al thin film was then roll-pressed to prepare a positive electrode.

96 wt % of carbon powder as a negative electrode active material, 3 wt % of PVDF as a binder, and 1 wt % of carbon black, as a conductive agent, were added to NMP, as a solvent, to prepare a negative electrode active material slurry (solid concentration of 65 wt %). A 10 μm thick copper (Cu) thin film, as a negative electrode collector, was coated with the negative electrode active material slurry and dried, and the coated Cu thin film was then roll-pressed to prepare a negative electrode.

After an electrode assembly was prepared by sequentially stacking the prepared positive electrode, a separator formed of three layers of polypropylene/polyethylene/polypropylene (PP/PE/PP) and the prepared negative electrode, the electrode assembly was put in a battery case, the composition for a gel polymer electrolyte was injected, and aging was then performed for 2 days. Thereafter, the aged composition for a gel polymer electrolyte was cured at 70° C. for 5 hours to prepare a lithium secondary battery including a thermally polymerized gel polymer electrolyte.

Example 6

A composition for a gel polymer electrolyte and a lithium secondary battery using the same were prepared in the same manner as in Example 5 except that 0.3 g of the oligomer represented by Formula 1a-1 (n2=55, weight-average molecular weight (Mw): 5,000) and 0.03 g of a polymerization initiator were used in 98.67 g of a non-aqueous organic solvent (EC:PC:DEC=3:2:5 vol %), in which 1 M LiFSI was dissolved, during the preparation of the composition for a gel polymer electrolyte in Example 5 (see Table 1 below).

Example 7

A composition for a gel polymer electrolyte and a lithium secondary battery using the same were prepared in the same manner as in Example 5 except that 20 g of the oligomer represented by Formula 1a-1 (n2=55, weight-average molecular weight (Mw): 5,000) and 2 g of a polymerization initiator were used in 77 g of the non-aqueous organic solvent during the preparation of the composition for a gel polymer electrolyte in Example 5 (see Table 1 below).

Example 8

A composition for a gel polymer electrolyte and a lithium secondary battery using the same were prepared in the same manner as in Example 5 except that 0.3 g of the oligomer represented by Formula 1a-1 and 0.03 g of a polymerization initiator were used in 98.67 g of the non-aqueous organic solvent during the preparation of the composition for a gel polymer electrolyte in Example 5 (see Table 1 below).

Example 9

A composition for a gel polymer electrolyte and a lithium secondary battery using the same were prepared in the same manner as in Example 5 except that 30 g of the oligomer represented by Formula 1a-1 (n2=55, weight-average molecular weight (Mw): 5,000) and 3 g of a polymerization initiator were used in 66 g of the non-aqueous organic solvent during the preparation of the composition for a gel polymer electrolyte in Example 5 (see Table 1 below).

Example 10

A composition for a gel polymer electrolyte and a lithium secondary battery using the same were prepared in the same manner as in Example 5 except that the amount of the organic solvent used was 83.5 g and 10 g of inorganic particles ($TiO_2$) was further included during the preparation of the composition for a gel polymer electrolyte in Example 5 (see Table 1 below).

Comparative Example 3

A composition for a gel polymer electrolyte and a lithium secondary battery using the same were prepared in the same manner as in Example 5 except that a compound of the following Formula 2, instead of the oligomer of Formula 1a-1, was included as an oligomer during the preparation of the composition for a gel polymer electrolyte in Example 5 (see Table 1 below).

[Formula 2]

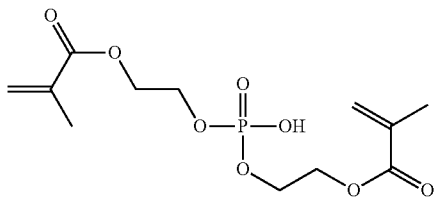

$$\text{Resistance increase rate (\%) of battery} = [(\text{final resistance} - \text{initial resistance})/\text{initial resistance}] \times 100 \, (\%) \quad [\text{Equation 2}]$$

Also, a thickness increase rate (%) and a resistance increase rate (%) at 80° C. were measured for the lithium secondary batteries including the gel polymer electrolytes prepared in Examples 5 to 10 and the lithium secondary battery including the gel polymer electrolyte prepared in Comparative Example 3 by the above-described method.

The thickness increase rate (%) and the resistance increase rate (%) are presented in Table 2 below.

TABLE 1

| | | Lithium salt | Non-aqueous solvent Type | Amount added (g) | Oligomer Formula | Amount added (g) | Additive Type | Amount added (g) | Polymerization initiator Amount added (g) | Inorganic particles Type | Amount added (g) |
|---|---|---|---|---|---|---|---|---|---|---|---|
| Example 1 | Liquid electrolyte | 1M LiPF$_6$ | EC:EMC = 3:7 | 95 | 1a-1 | 5 | — | — | — | — | — |
| Example 2 | | 1M LiPF$_6$ | EC:EMC = 3:7 | 80 | 1a-1 | 20 | — | — | — | — | — |
| Example 3 | | 1M LiPF$_6$ | EC:EMC = 3:7 | 99.7 | 1a-1 | 0.3 | — | — | — | — | — |
| Example 4 | | 1M LiPF$_6$ | EC:EMC = 3:7 | 70 | 1a-1 | 30 | — | — | — | — | — |
| Comparative Example 1 | | 1M LiPF$_6$ | EC:EMC = 3:7 | 100 | — | — | — | — | — | — | — |
| Comparative Example 2 | | 1M LiFSI | EC:PC:DEC = 3:2:5 | 100 | — | — | — | — | — | — | — |
| Example 5 | Gel polymer electrolyte | 1M LiPF$_6$ | EC:EMC = 3:7 | 93.5 | 1a-1 | 5 | VC | 1 | 0.5 | — | — |
| Example 6 | | 1M LiFSI | EC:PC:DEC = 3:2:5 | 98.67 | 1a-1 | 0.3 | VC | 1 | 0.03 | — | — |
| Example 7 | | 1M LiPF$_6$ | EC:EMC = 3:7 | 77 | 1a-1 | 20 | VC | 1 | 2 | — | — |
| Example 8 | | 1M LiPF$_6$ | EC:EMC = 3:7 | 98.67 | 1a-1 | 0.3 | VC | 1 | 0.03 | — | — |
| Example 9 | | 1M LiPF$_6$ | EC:EMC = 3:7 | 66 | 1a-1 | 30 | VC | 1 | 3 | — | — |
| Example 10 | | 1M LiPF$_6$ | EC:EMC = 3:7 | 83.5 | 1a-1 | 5 | VC | 1 | 0.5 | TiO$_2$ | 10 |
| Comparative Example 3 | | 1M LiPF$_6$ | EC:EMC = 3:7 | 93.5 | 2 | 5 | VC | 1 | 0.5 | — | — |

EXPERIMENTAL EXAMPLES

Experimental Example 1: High-Temperature Storage Stability Evaluation Experiment The lithium secondary batteries including the liquid electrolytes prepared in Examples 1 to 4 and the lithium secondary batteries including the liquid electrolytes prepared in Comparative Examples 1 and 2 were respectively fully charged at a constant current-constant voltage of 0.33 C/4.15 V, and discharged at 5 C for 10 seconds at a state of charge (SOC) of 50% to perform initial charge and discharge. After the initial charge and discharge, each battery was charged at 4.15 V and stored at 80° C. for 10 weeks (SOC; 100), and a thickness increase rate (%) and a resistance increase rate (%) were then measured.

The thickness increase rate (%) and the resistance increase rate (%) are presented in Table 2 below.

In this case, the thickness increase rate (%) and resistance increase rate (%) of each battery were calculated by using the following Equations 1 and 2.

$$\text{Thickness increase rate (\%) of battery} = [(\text{final thickness} - \text{initial thickness})/\text{initial thickness}] \times 100 \, (\%) \quad [\text{Equation 1}]$$

TABLE 2

| | | Cell thickness increase rate (%) | Cell resistance increase rate (%) |
|---|---|---|---|
| Liquid electrolyte | Example 1 | 10.5 | 11.7 |
| | Example 2 | 10.3 | 11.1 |
| | Example 3 | 25.2 | 29.5 |
| | Example 4 | 15.3 | 34.5 |
| | Comparative Example 1 | 73.5 | 80.5 |
| | Comparative Example 2 | 68.1 | 75.9 |
| Gel polymer electrolyte | Example 5 | 9.5 | 12.1 |
| | Example 6 | 22.4 | 29.2 |
| | Example 7 | 20.3 | 20.2 |
| | Example 8 | 25.6 | 27.1 |
| | Example 9 | 15.6 | 35.6 |
| | Example 10 | 7.7 | 12.6 |
| | Comparative Example 3 | 50.6 | 68.5 |

Referring to Table 2, with respect to the lithium secondary batteries of Examples 1 to 4 which included the liquid electrolytes including the oligomer represented by Formula 1a-1 of the present invention, it may be understood that thickness increase rates (%) after 10 weeks at 80° C. were significantly lower than those of the lithium secondary batteries of Comparative Examples 1 and 2 which included the liquid electrolytes not including the oligomer.

Also, with respect to the lithium secondary batteries of Examples 1 to 4 which included the liquid electrolytes including the oligomer represented by Formula 1a-1 of the present invention, it may be understood that resistance increase rates (%) after 10 weeks at 80° C. were significantly reduced in comparison to those of the lithium secondary batteries of Comparative Examples 1 and 2 which included the liquid electrolytes not including the oligomer.

Furthermore, referring to Table 2, with respect to the lithium secondary batteries of Examples 5 to 10 which included the gel polymer electrolytes including the polymer derived from the oligomer represented by Formula 1a-1 of the present invention, it may be understood that thickness increase rates (%) after 10 weeks at 80° C. were significantly lower than that of the lithium secondary battery of Comparative Example 3 which included the gel polymer electrolyte including the polymer derived from the compound of Formula 2.

Also, with respect to the lithium secondary batteries of Examples 5 to 10 which included the gel polymer electrolytes including the polymer derived from the oligomer represented by Formula 1a-1 of the present invention, it may be understood that resistance increase rates (%) after 10 weeks at 80° C. were significantly reduced in comparison to that of the lithium secondary battery of Comparative Example 3 which included the gel polymer electrolyte including the polymer derived from the compound of Formula 2.

Experimental Example 2: Measurement of Amount of Gas Generated

After the lithium secondary battery including the liquid electrolyte prepared in Example 1 and the lithium secondary battery including the liquid electrolyte prepared in Comparative Example 1 were charged and discharged in the same manner as in Experimental Example 1, amounts of CO and $CO_2$ gases generated in each battery during high-temperature storage were measured by using gas chromatography (GC). The comparison results thereof are presented in FIG. 1 below.

As illustrated in FIG. 1, it may be understood that the amount of the CO gas generated in the lithium secondary battery of Example 1 which included the liquid electrolyte including the oligomer of the present invention was about 100 µl, and the amount of the $CO_2$ gas was about 200 µl.

In contrast, with respect to the secondary battery of Comparative Example 1 which included the liquid electrolyte not including the oligomer, the amount of the CO gas generated was about 700 µl, and the amount of the $CO_2$ gas was about 500 µl, wherein it may be understood that the amount of the gas generated was about 6 times or more that of the secondary battery of Example 1.

Form these results, it may be understood that, since the liquid electrolyte including the oligomer according to the embodiment of the present invention had excellent oxidation stability, the amount of the gas generated in the secondary battery was significantly reduced.

Experimental Example 3: Measurement of Amount of Gas Generated

After the lithium secondary batteries including the gel polymer electrolytes prepared in Examples 5 and 6 and the lithium secondary battery including the gel polymer electrolyte prepared in Comparative Example 3 were charged and discharged in the same manner as in Experimental Example 1, amounts of CO and $CO_2$ gases generated in each battery during high-temperature storage were measured by using gas chromatography (GC). The comparison results thereof are presented in FIG. 2 below.

Figure 2:
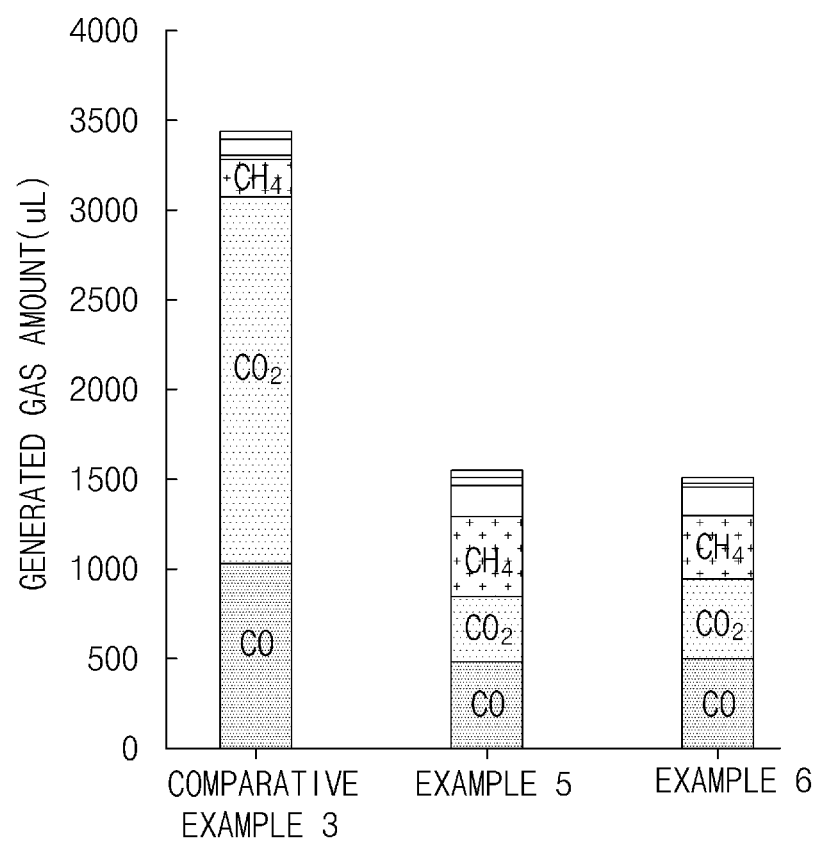
FIG. 2 is a graph illustrating amounts of gas generated from lithium secondary batteries of Examples 5 and 6 and Comparative Example 3 according to Experimental Example 3 of the present invention.

As illustrated in FIG. 2, it may be understood that the amounts of the CO gas generated in the lithium secondary batteries of Examples 5 and 6 which included the gel polymer electrolytes including the polymer derived from the oligomer according to the embodiment of the present invention were about 500 µl, and the amounts of the $CO_2$ gas were about 300 µl or less.

In contrast, with respect to the lithium secondary battery of Comparative Example 3 which included the gel polymer electrolyte including the polymer derived from the compound of Formula 2, the amount of the CO gas generated was about 1,000 µl, and the amount of the $CO_2$ gas was about 2,000 µl, wherein it may be understood that the amount of the gas generated was 2 times or more those of the secondary batteries of Examples 5 and 6.

That is, with respect to the secondary batteries of Examples 5 and 6, it may be understood that the amount of the CO gas was reduced by 50% or more and the amount of the $CO_2$ gas was reduced by about 70% to about 80% or more in comparison to the secondary battery of Comparative Example 3.

Form these results, it may be understood that, since the gel polymer electrolyte including the oligomer according to the embodiment of the present invention had excellent oxidation stability, the amount of the gas generated in the secondary battery was significantly reduced.

Experimental Example 4: Electrochemical Stability Experiment

<Oxidation Stability Test in High-Voltage Region>

Oxidation stability tests were performed for the gel polymer electrolyte of Example 5 and the liquid electrolyte of Comparative Example 1 at 60° C. by linear sweep voltammetry using a bipolar cell under test conditions as listed in Table 3 below. The results thereof are presented in FIG. 3.

TABLE 3

| Working electrode | Denka Black + binder (KF7208, ZEON CORPORATION) = 95%:5% |
|---|---|
| Counter electrode | Li metal |
| Reference electrode | Li metal |
| Voltage range | 0 V~6 V |
| Scan rate | 5 mV/S, 60 |
| Remarks | Coin half-cell |

Figure 3:
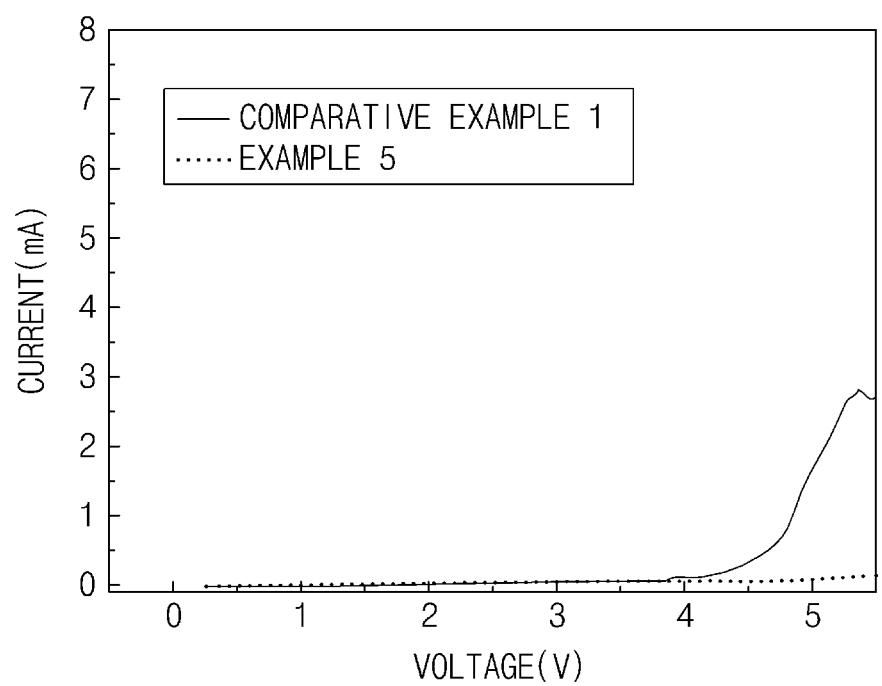
FIG. 3 is a graph illustrating the results of evaluation of oxidation stabilities of a gel polymer electrolyte of Example 5 and a liquid electrolyte of Comparative Example 1 according to Experimental Example 4 of the present invention.

As illustrated in FIG. 3, with respect to the liquid electrolyte of Comparative Example 1, it may be understood that a significant change in oxidation occurred from a 4.4 V region. In contrast, with respect to the gel polymer electrolyte of Example 5, it may be understood that a change in oxidation did not occur even above a 5 V region.

That is, from these results, it may be understood that the gel polymer electrolyte of Example 5, which included the polymer derived from the oligomer represented by Formula 1, had excellent oxidation stability even in a high-voltage region of 4.4 V or more.

<Reduction Stability Test in Low-Voltage Region>

Reduction stability tests were performed for the gel polymer electrolyte of Example 6 and the liquid electrolyte of Comparative Example 2 in a low-voltage region by cyclic voltammetry using a triode cell under test conditions as listed in Table 4 below. The results thereof are presented in FIG. 4.

TABLE 4

| | |
|---|---|
| Working electrode | Graphite (product name: AGM1 100) |
| Counter electrode | Li metal |
| Reference electrode | Li metal |
| Voltage range | 0 V~3 V |
| Scan rate | 1 mV/S |

Figure 4:
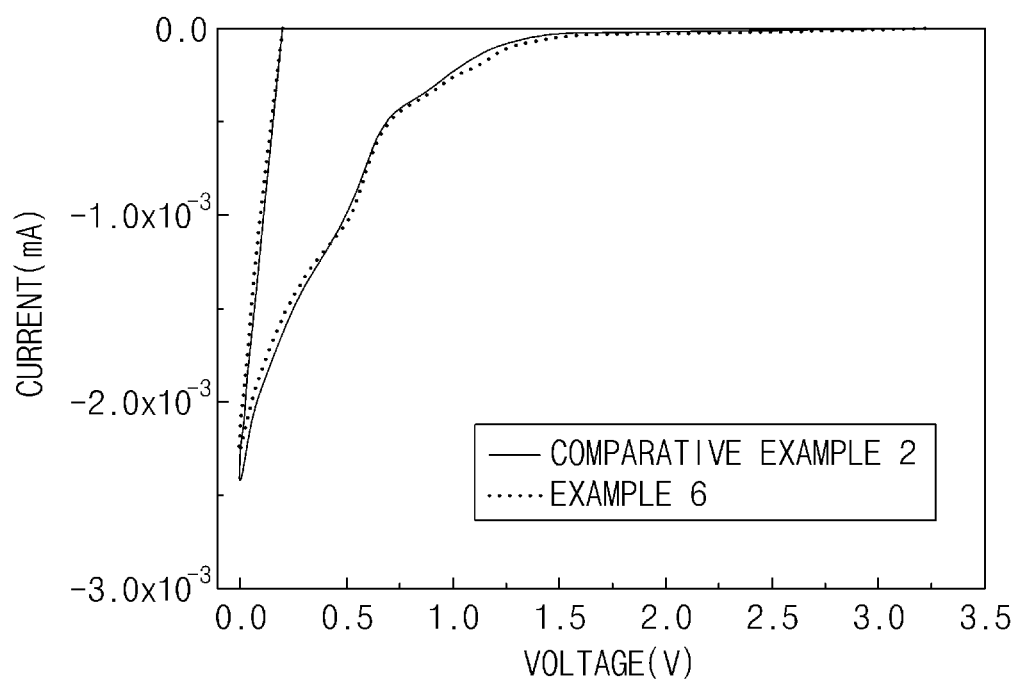
FIG. 4 is a graph illustrating the results of evaluation of reduction stabilities of a gel polymer electrolyte of Example 6 and a liquid electrolyte of Comparative Example 2 according to Experimental Example 4 of the present invention.

As illustrated in FIG. 4, with respect to the gel polymer electrolyte of Example 6 which included the polymer derived from the oligomer represented by Formula 1, it may be understood that a peak of current increase, which was generated while the oligomer was reduced, did not appear on the graph similar to the liquid electrolyte of Comparative Example 2 in which the oligomer was not added.

From these results, it may be confirmed that the reduction stability of the gel polymer electrolyte of Example 6, which included the polymer derived from the oligomer represented by Formula 1, was not reduced.

Experimental Example 5: Room Temperature Performance Evaluation

The lithium secondary battery including the gel polymer electrolyte prepared in Example 5 and the lithium secondary battery including the gel polymer electrolyte prepared in Comparative Example 3 were respectively charged at a constant current of 0.5 C to a voltage of 4.2 V at 25° C. Thereafter, each lithium secondary battery was charged at a constant voltage of 4.2 V and the charge was terminated when a charge current became 0.275 mAh. After each lithium secondary battery was left standing for 10 minutes, each lithium secondary battery was discharged at a constant current of 0.5 C to a voltage of 3.0 V. After the charge and discharge were repeated 700 cycles, capacities of the batteries were measured and illustrated in FIG. 5.

Figure 5:
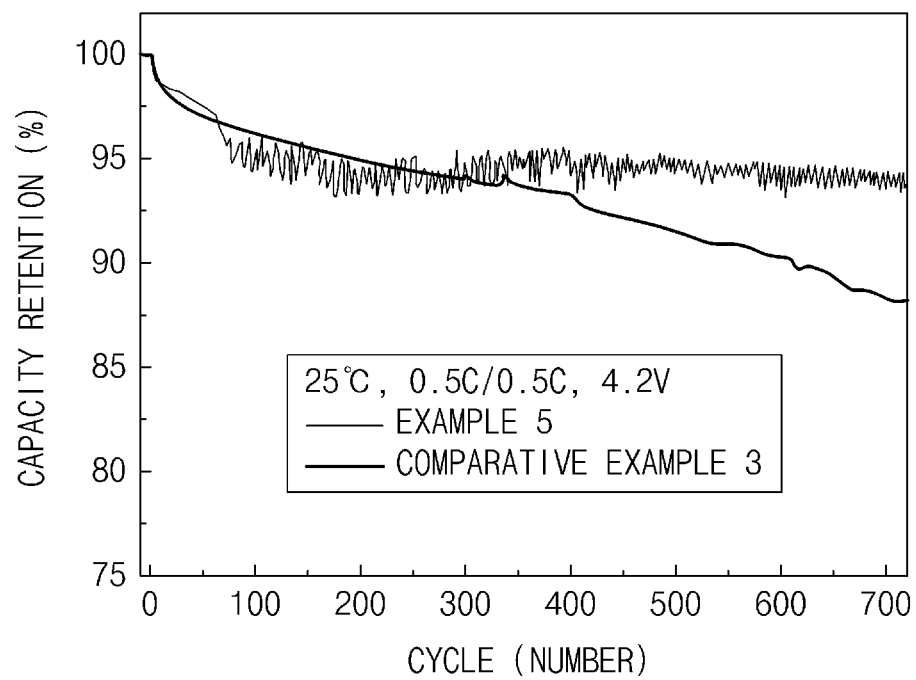
FIG. 5 is a graph illustrating the results of performance evaluation at room temperature (25° C.) of lithium secondary batteries of Example 5 and Comparative Example 3 according to Experimental Example 5 of the present invention.

As illustrated in FIG. 5, the lithium secondary battery of Example 5 had almost no change in capacity retention even after 700 cycles and had a capacity retention of 93% or more even in a $700^{th}$ cycle.

In contrast, the lithium secondary battery of Comparative Example 3 had capacity retention similar to that of the lithium secondary battery of Example 5 of the present invention up to initial 200 cycles, but the capacity retention was significantly reduced from about $a_{250}$th cycle and was rapidly reduced to less than about 88% in the $_{700}$th cycle.

Thus, as confirmed in FIG. 5, it may be understood that cycle life characteristics at room temperature of the lithium secondary battery of Example 5 of the present invention was improved in comparison to those of the lithium secondary battery of Comparative Example 3.

Experimental Example 6: Low Temperature Performance Evaluation

Figure 6:
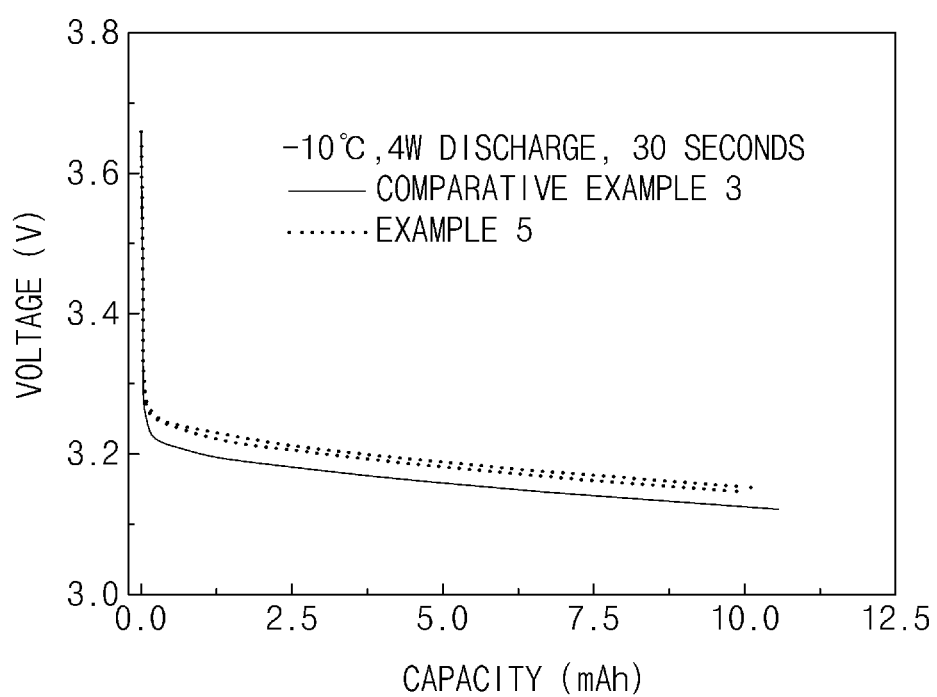
FIG. 6 is a graph illustrating the results of performance evaluation at low temperature (−10° C.) of the lithium secondary batteries of Example 5 and Comparative Example 3 according to Experimental Example 6 of the present invention.

Low temperature performances of the lithium secondary battery including the gel polymer electrolyte prepared in Example 5 and the lithium secondary battery including the gel polymer electrolyte prepared in Comparative Example 3 were evaluated, and the results thereof are presented in FIG. 6.

Specifically, in order to evaluate the low temperature performances of the lithium secondary batteries of Example 5 and Comparative Example 3, after each of the lithium secondary batteries of Example 5 and Comparative Example 3 was set to a SOC of 50% at a rate of 0.5 C, each lithium secondary battery was first charged at a constant current-constant voltage of about 400 mAh/about 3.65 V, and resistance at low temperature was then measured from a voltage drop which was obtained by discharging each secondary battery at a power of 4 W for 30 seconds at −10° C.

As illustrated in FIG. 6, it may be understood that the lithium secondary battery of Example 5, which included the gel polymer electrolyte including the oligomer of the present invention, had a relatively lower voltage drop than the lithium secondary battery of Comparative Example 3.

Thus, it may be understood that low-temperature characteristics of the lithium secondary battery of Example 5, which included the gel polymer electrolyte including the oligomer of the present invention, were improved in comparison to those of the lithium secondary battery of Comparative Example 3.

Experimental Example 7: Thermal Stability Evaluation

After the lithium secondary battery including the gel polymer electrolyte prepared in Example 5 and the lithium secondary battery including the gel polymer electrolyte prepared in Comparative Example 3 were disassembled in a state in which each lithium secondary battery was fully charged at 4.2 V, the negative electrodes were measured with a differential scanning calorimeter (DSC). As measurement conditions, the negative electrodes were measured at a scan rate of 10° C./min from 25° C. to 400° C. The results thereof are presented in FIG. 7.

In general, an SEI (solid polymer electrolyte) film is formed on the surface of the negative electrode during initial charge, wherein, if the SEI film is not decomposed at high temperature, a side reaction between the negative electrode and the electrolyte is prevented, and thus, stability of the battery is improved.

Figure 7:
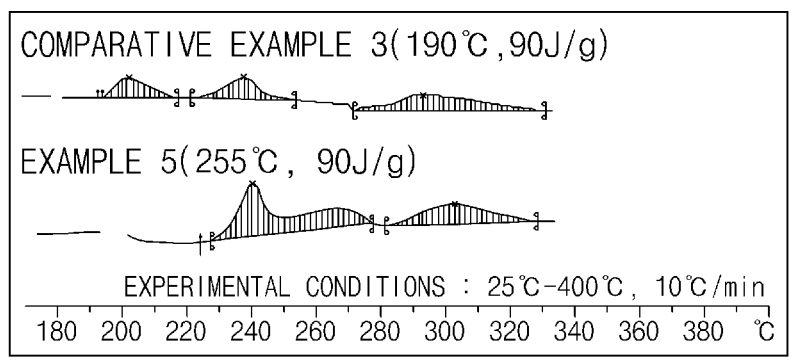
FIG. 7 is a graph illustrating the results of evaluation of thermal stabilities of the lithium secondary batteries of Example 5 and Comparative Example 3 according to Experimental Example 7 of the present invention.

As illustrated in FIG. 7, with respect to the secondary battery of Example 5, an enthalpy was 90 J/g at a decomposition temperature of the SEI film of 255° C., but the secondary battery of Comparative Example 3 had an enthalpy of 90 J/g at 190° C.

That is, with respect to the lithium secondary battery of Example 5 in which the gel polymer electrolyte including the oligomer according to the embodiment of the present invention was used, it may be understood that the decomposition temperature of the SEI film on the surface of the negative electrode was about 60° C. or more higher than that of Comparative Example 1. Thus, it may be confirmed that the lithium secondary battery of Example 5 of the present invention had better thermal stability than the lithium secondary battery of Comparative Example 3.

The invention claimed is:
1. An electrolyte for a lithium secondary battery, the electrolyte comprising:
a lithium salt;
an organic solvent; and
an oligomer represented by Formula 1:

[Formula 1]

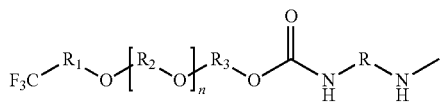

wherein, in Formula 1,
R is an aliphatic hydrocarbon group or an aromatic hydrocarbon group,
$R_1$ to $R_3$ are each independently a fluorine-substituted or unsubstituted alkylene group having 1 to 5 carbon atoms,
$R_4$ is an alkylene group having 1 to 4 carbon atoms,
R' is hydrogen or an alkyl group having 1 to 3 carbon atoms,
a is 1 to 3,
n is the number of repeating units, and
n is an integer of 1 to 75.

2. The electrolyte for a lithium secondary battery of claim 1, wherein, in the oligomer represented by Formula 1, the aliphatic hydrocarbon group comprises at least one alicyclic hydrocarbon group selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms, or a linear hydrocarbon group selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms, and
the aromatic hydrocarbon group comprises a substituted or unsubstituted arylene group having 6 to 20 carbon atoms; or a substituted or unsubstituted heteroarylene group having 2 to 20 carbon atoms.

3. The electrolyte for a lithium secondary battery of claim 1, wherein the oligomer represented by Formula 1 comprises an oligomer represented by Formula 1a:

[Formula 1a]

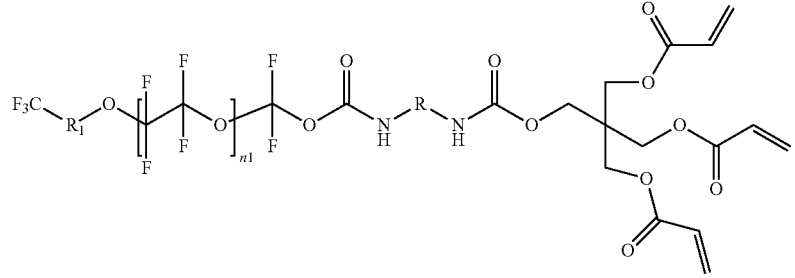

wherein in Formula 1a,
R is an aliphatic hydrocarbon group or an aromatic hydrocarbon group,
$R_1$ is a fluorine-substituted or unsubstituted alkylene group having 1 to 5 carbon atoms,
n1 is the number of repeating units, and
n1 is an integer of 1 to 75.

4. The electrolyte for a lithium secondary battery of claim 3, wherein the oligomer represented by Formula 1a comprises an oligomer represented by Formula 1a-1:

[Formula 1a-1]

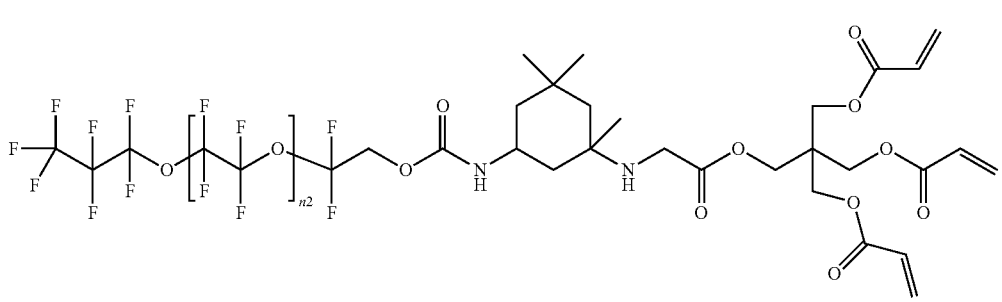

wherein in Formula 1a-1,
n2 is the number of repeating units, and
n2 is an integer of 20 to 75.

5. The electrolyte for a lithium secondary battery of claim 1, wherein the oligomer represented by Formula 1 is included in an amount of 0.5 wt % to 20 wt % based on a total weight of the electrolyte for a lithium secondary battery.

6. The electrolyte for a lithium secondary battery of claim 1, wherein the oligomer represented by Formula 1 is included in an amount of 0.5 wt % to 15 wt % based on a total weight of the electrolyte for a lithium secondary battery.

7. The electrolyte for a lithium secondary battery of claim 1, wherein, in a case in which the electrolyte for a lithium secondary battery comprises the oligomer represented by Formula 1, the electrolyte for a lithium secondary battery is a liquid electrolyte.

8. The electrolyte for a lithium secondary battery of claim 1, wherein, in a case in which the electrolyte for a lithium secondary battery comprises a polymer derived from the oligomer represented by Formula 1, the electrolyte for a lithium secondary battery is a gel polymer electrolyte.

9. The electrolyte for a lithium secondary battery of claim 8, wherein the polymer derived from the oligomer represented by Formula 1 is a matrix polymer in which the oligomer represented by Formula 1 is polymerized in the presence of a polymerization initiator to have a three-dimensional structure.

10. The electrolyte for a lithium secondary battery of claim 8, wherein the gel polymer electrolyte further comprises inorganic particles.

11. The electrolyte for a lithium secondary battery of claim 10, wherein the inorganic particles comprise a single material selected from the group consisting of $BaTiO_3$, $BaTiO_3$, $Pb(Zr_xTi_{1-x})O_3$ ($0 \leq x \leq 1$) (PZT), $Pb_{1-b}La_bZr_{1-c}Ti_cO_3$ (PLZT, where $0<b<1$, $0<c<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, and a mixture thereof, or a mixture of two or more thereof.

12. The electrolyte for a lithium secondary battery of claim 10, wherein the inorganic particles are included in an amount of 10 wt % to 25 wt % based on a total weight of the gel polymer electrolyte.

13. A lithium secondary battery comprising a negative electrode, a positive electrode, a separator disposed between the negative electrode and the positive electrode, and the electrolyte for a lithium secondary battery of claim 1.

14. The lithium secondary battery of claim 13, wherein the electrolyte for a lithium secondary battery is a liquid electrolyte.

15. The lithium secondary battery of claim 13, wherein the electrolyte for a lithium secondary battery is a gel polymer electrolyte.

* * * * *